United States Patent [19]
Ahmed et al.

[11] Patent Number: 6,020,293
[45] Date of Patent: Feb. 1, 2000

[54] ENZYMATIC DETERGENT COMPOSITION AND METHOD FOR DEGRADING AND REMOVING BACTERIAL CELLULOSE

[75] Inventors: Fahim U. Ahmed; James E. Goldschmidt; Gerald E. La Cosse, all of Greensboro, N.C.

[73] Assignee: Kay Chemical Company, Greensboro, N.C.

[21] Appl. No.: 09/095,720

[22] Filed: Jun. 11, 1998

Related U.S. Application Data

[62] Division of application No. 08/610,946, Mar. 5, 1996, Pat. No. 5,783,537.

[51] Int. Cl.$^7$ .............................. C11D 3/386; C11D 3/10; C02F 3/00
[52] U.S. Cl. .................. 510/193; 510/191; 510/194; 510/195; 510/199; 510/392; 510/471; 435/264; 210/632; 134/39; 134/40
[58] Field of Search .................. 510/191, 193, 510/194, 195, 199, 392, 471; 435/264; 210/632; 134/39, 40

[56] References Cited

U.S. PATENT DOCUMENTS

| | | | |
|---|---|---|---|
| 2,497,057 | 2/1950 | Pape et al. ............................... | 510/191 |
| 3,506,582 | 4/1970 | Gertzman et al. ....................... | 510/195 |
| 3,532,599 | 10/1970 | Cooperman .............................. | 435/264 |
| 4,587,032 | 5/1986 | Rogers ..................................... | 510/195 |
| 4,610,800 | 9/1986 | Durham et al. .......................... | 435/264 |
| 4,861,511 | 8/1989 | Kaplan ..................................... | 510/193 |
| 4,900,467 | 2/1990 | Smith ....................................... | 510/195 |
| 4,936,994 | 6/1990 | Wiatr ....................................... | 210/632 |
| 5,011,538 | 4/1991 | Smith ................................. | 134/22.13 |
| 5,238,572 | 8/1993 | Hernandez-Mena et al. .......... | 210/632 |
| 5,238,843 | 8/1993 | Carpenter et al. ...................... | 435/264 |
| 5,264,146 | 11/1993 | Tobiason .............................. | 134/7 |
| 5,284,587 | 2/1994 | Wong et al. ............................. | 210/606 |
| 5,326,477 | 7/1994 | Fugua et al. ............................. | 210/632 |
| 5,336,426 | 8/1994 | Rader et al. ............................ | 510/195 |
| 5,348,682 | 9/1994 | Finley et al. ............................ | 510/373 |
| 5,389,157 | 2/1995 | Smith ................................. | 134/22.13 |
| 5,407,595 | 4/1995 | Kamiya .................................... | 510/195 |
| 5,411,666 | 5/1995 | Hollis et al. ............................ | 210/632 |
| 5,429,764 | 7/1995 | Van Vlahaks et al. ................. | 510/195 |
| 5,432,184 | 7/1995 | Donofrio et al. ....................... | 514/345 |
| 5,443,656 | 8/1995 | Burrows et al. .......................... | 134/42 |

OTHER PUBLICATIONS

Japan Patent Abstracts 58–101698, Jun. 16, 1983.
Kirk–Othmer, Encyclopedia of Chemical Technology, vol. 5, pp. 476–496, No Date Given.
Cellulases–Enzymes that Hydrolyze Fiber, "Novo's Handbook of Practical Biotechnology," C.O.L. Boyce ed., Novo Nordisk 2d ed., pp. 77–82 1986.
Derwent Abstract WPI90–115983/15.
Schramm et al., "Factors Affecting Production of Cellulose at the Air/Liquid Interface of a Culture of *Acetobacter xylinum*," J. Gen. Microbiol. 11:123–29 (1954).
Peitersen, "Production of Cellulose and Protein from Barley Straw by *Techoderma vivide*," Biotech & Bioeng. 17:361–74 (1975).
Mandels et al., "Introduction of Cellulose in Fungi by Cellobiase," J. Bacteriol. 79:816–26 (1960).
Mandels et al., "Sophorose as an Inducer of Cellulose in *Trichoderma vivide*," J. Bacteriol. 83:400–08 (1962).
Katz et al., "Production of Glucose by Enzymatic Hydrolysis of Cellulose," Appl. Microbiol. 16(2):419–20 (1968).

*Primary Examiner*—Yogendra Gupta
*Assistant Examiner*—Brian P. Mruk
*Attorney, Agent, or Firm*—Finnegan, Henderson, Farabow, Garrett & Dunner, L.L.P.

[57] ABSTRACT

This invention relates to an enzymatic detergent drain cleaner composition containing:

0.015–20 wt % of an acid cellulase enzyme having hydrolytic activity specific to β-glucosidic bonds;

1–70 wt % of a water soluble carbonate salt;

1–70 wt % of a water soluble acid that reacts in an aqueous medium with the carbonate salt to form carbon dioxide that dissolves in the aqueous medium;

0.1–10 wt % of a surfactant; and 0.05–5 wt % of a thickening agent. This detergent composition may be used as an enzymatic detergent drain cleaner or in a method for removing or preventing bacterial cellulose deposits in an aqueous system at a solution temperature of up to about 60° C. and a pH of about 2 to about 7.

19 Claims, No Drawings

ENZYMATIC DETERGENT COMPOSITION AND METHOD FOR DEGRADING AND REMOVING BACTERIAL CELLULOSE

This application is a division of Ser. No. 08/610,946, filed Mar. 5, 1996, now U.S. Pat. No. 5,783,537.

BACKGROUND OF THE INVENTION

1. Field of Invention

This invention relates to compositions and methods for degrading, removing, and preventing bacterial cellulose deposits. More particularly, this invention relates to enzymatic detergent compositions and methods of using them to degrade, remove, and prevent polymeric bacterial cellulose deposits in aqueous systems such as drain pipes.

2. Description of the Related Art

Traditional approaches to controlling or eliminating the problem of bacterial cellulose build-up in sugar or alcohol enriched drain systems typically have included contacting the cellulose with highly corrosive chemicals, such as concentrated hydrochloric acid, concentrated sulfuric acid, sodium hypochlorite, sodium silicate, chlorine bleach, phenylmercuric acetate, pentachlorophenol, tributyltin oxide, isocyanurates, or sodium hydroxide. However, these treatments have proven ineffective or incapable of removing deposited-cellulosic slime, and they have several drawbacks associated with their use. Most of these chemicals are toxic to many organisms, including humans. Their toxicity makes them very dangerous during handling, and they contaminate and pollute if they are discharged into the environment. In addition to the problems engendered by toxicity, many of these toxic and hazardous chemicals can damage the drain systems where bacterial cellulose deposits are found.

Mechanical water jetting and rotor rooting are nontoxic alternatives to the chemical treatments described above. Of these, water jetting is preferred because it is less likely to cause damage to the drain systems. Yet neither method is an effective, acceptable treatment to prevent or remove bacterial cellulose deposits in drain systems. Bacterial cellulose accumulates rapidly in susceptible drain systems, and to keep such drains completely clear by these mechanical means requires frequent treatments. The frequent interruption in drain service occasioned by jetting or rooting makes them impractical. In addition, both methods involve significant manual labor, adding considerably to the cost of removing the deposits. Their cost and inefficiency make jetting or rooting uneconomical as prophylactic treatments. The result is that many drains having a bacterial cellulose problem are ineffectively and infrequently treated and therefore function at a severely reduced capacity or not at all.

U.S. Pat. No. 5,443,656 to Burrows et al. proposes a process for degrading fibrous cellulose materials, more particularly toilet tissue in aqueous waste holding tanks, by contacting the material with a composition comprising a cellulase enzyme, sodium bicarbonate, and citric acid. However, this method does not use an enzyme having activity specific to polymeric cellulose typically produced by microorganisms such as Acetobacter bacteria, and the enzyme concentrations disclosed are too low for effectively treating cellulose deposited by such microorganisms. Moreover, compositions disclosed in this reference contain large quantities of sodium chloride, which drastically reduces cellulase enzyme activity under the conditions wherein the present invention is applied.

U.S. Pat. No. 3,506,582 to Gertzman discloses enzymatic drain cleaner compositions composed of a metal salt of carbonic acid, glucono-delta-lactone, and a mixture of enzymes, including amylase, protease, lipase, pectinase, and cellulase. These compositions suffer the same drawbacks found in the Burrows patent, i.e., they do not address the polymeric bacterial cellulose substrate produced by microorganisms such as Acetobacter bacteria, and they contain significant amounts of sodium chloride, which inhibits enzyme activity under the conditions where such bacterial cellulose deposits are found. Moreover, the disclosed compositions contain relatively high concentrations of amylase and lipase enzymes specific to degrade starchy, greasy, or fatty materials rather than bacterial cellulose.

U.S. Pat. No. 5,264,146 to Tobiason discloses a method and composition for carrying sewer or drain cleaning agents, including lipase and lipase excreting bacteria, to clean draines and sewer lines. This reference neither discloses nor suggests using an enzyme having activity specific to the troublesome cellulose deposited in sugar and alcohol enriched environments by microorganisms such as Acetobacter bacteria. Moreover, the disclosed compositions can contain other cleaning agents, including corrosive chemicals such as caustic soda and harmful solvents such as dichlorobenzene.

U.S. Pat. No. 5,407,595 to Kamiya discloses a detergent drain pipe cleaning composition comprising a lipocatabolic lipase, an imbibing agent such as sodium bicarbonate, and an N-acyclic amino acid, but no cellulase enzyme. Thus, this composition also is not specific to cellulose produced by microorganisms such as Acetobacter bacteria, and therefore is not effective to address the problem solved by the present invention.

SUMMARY OF INVENTION

The present invention relates to enzymatic detergent drain cleaners, compositions of matter, and methods for removing or preventing cellulose deposits in aqueous systems produced by microorganisms such as Acetobacter bacteria. These drain cleaners, compositions and methods are safe and economical, do not require the use of chemicals that are hazardous or toxic to humans and other life forms, decrease the risk of environmental harm, and minimize ecological harm to the aqueous systems requiring removal or prevention of bacterial cellulose deposits.

Particularly, the present invention relates to drain cleaners and compositions containing a biologically derived acid cellulase enzyme possessing hydrolytic activity specific to β-glucosidic bonds in cellulose produced and deposited in aqueous systems by microorganisms such as Acetobacter bacteria. The inventors have also discovered that by providing the enzymatic detergent drain cleaners and compositions with an enriched dissolved carbon dioxide concentration or with a system for enriching the dissolved carbon dioxide concentration in the aqueous system being treated, the efficacy of the enzymatic hydrolysis of cellulose is significantly increased. In the inventive methods, the enzymatic detergent drain cleaners and compositions are contacted with an aqueous system in need of removal or prevention of bacterial cellulose deposits for a sufficient time to allow at least partial hydrolysis of the bacterial cellulose, thereby effecting its easy removal. The inventors also have discovered preferred systems for generating and enriching carbon dioxide, which systems also contribute detergent action to the claimed drain cleaners, compositions and methods, and preferred surfactants and thickening agents that improve the effectiveness of the claimed drain cleaners, compositions and methods.

DETAILED DESCRIPTION OF THE INVENTION

Microbial cellulose is a floppy, slimy, gelatinous mass produced by microorganisms such as Acetobacter bacteria. This material appears in nature when such bacteria come into contact with decomposing fruit or other sugar or alcohol enriched matter. Acetobacter bacteria thrive in natural or artificial sugar or alcohol enriched acidic environments, such as are found in flowers, fruits, leaves, saps, honey, vinegar, cider, wine, beer, syrups, fruit juices, and the like. Fermentation of sugar by the Acetobacter bacteria results in a catalyzed biosynthesis of cellulose fibrils, which accumulate around the bacteria cells.

For example, *Acetobacter zymomonas* will ferment sucrose to ethanol via glucose within 8 to 12 hours of contacting the sucrose creating a highly suitable medium for the continued development of this acetic acid bacterium. Glucose forms the repeating cellobiose sub-units of cellulose, which is a β-1,4' polymer of D-glucose having β-glucosidic linkages. The general reaction scheme is believed to be as follows:

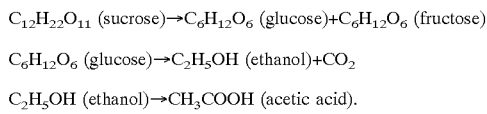

$C_{12}H_{22}O_{11}$ (sucrose)→$C_6H_{12}O_6$ (glucose)+$C_6H_{12}O_6$ (fructose)

$C_6H_{12}O_6$ (glucose)→$C_2H_5OH$ (ethanol)+$CO_2$ $C_2H_5OH$ (ethanol)→$CH_3COOH$ (acetic acid).

During fermentation, this acetic acid bacterium will begin to multiply after 2–3 days, utilizing the glucose or sucrose that are present in the early stages of the fermentation.

The cellulose strand secreted by the acetic subspecies *Acetobacter xylinium* is a particularly unusual product. Under appropriate conditions, this Acetobacter will synthesize cellulose from glucose into a ribbon of 0.05 to 0.1 μm diameter at a rate of approximately 2 μm per minute. The ribbons of this cellulose appear to polymerize and crystallize into larger strands, which provide a floating mat or pellicle that furnishes the aerobic Acetobacter with a surface on which to grow in an aqueous medium.

One particularly troublesome manifestation of polymeric bacterial cellulose occurs in sugar or alcohol enriched drain pipes such as are connected to soft drink or beverage stations including alcoholic beverage in food service, bar, and hotel establishments. Here, in this highly favorable environment, Acetobacter bacteria and other cellulose-secreting microorganisms easily produce polymeric bacterial cellulose, which builds up in the drain pipes and ultimately can block the drain system. Presently, there are no suitable, effective, safe, non-polluting, and non-corrosive solutions to this problem.

The inventors have discovered enzymatic detergent drain cleaners and compositions and methods of using them to prevent or remove polymeric bacterial cellulose deposits produced in aqueous systems by Acetobacter bacteria. In a first embodiment, the enzymatic detergent drain cleaner of the present invention comprises an acid cellulase enzyme having hydrolytic activity specific to the β-glucosidic bonds of bacterial cellulose, a water-soluble carbonate or bicarbonate salt, and a water soluble acid that reacts with the carbonate salt in an aqueous medium to form carbon dioxide that dissolves in the aqueous medium. Preferably, this enzymatic detergent drain cleaner is prepared in dry form including a surfactant and a thickener, which is conveniently storable in moisture barrier package until use.

In a second embodiment, the composition of the present invention comprises an aqueous solution of an acid cellulase enzyme having hydrolytic activity specific to the β-glucosidic bonds of bacterial cellulose and present in the aqueous solution an amount of at least 0.015 g/l. This aqueous solution further has a dissolved carbon dioxide concentration of at least 100 ppm at standard temperature and pressure.

In a third embodiment, the invention comprises a method wherein an aqueous system in need of removal or prevention of bacterial cellulose deposits is contacted with an enzymatic detergent drain cleaner or a composition of the present invention for a sufficient time to permit at least partial hydrolysis of the bacterial cellulose, followed by removing the partially hydrolyzed cellulose from the aqueous system.

The acidic cellulase enzyme specific to hydrolysis of the polymeric cellulose produced by Acetobacter bacteria can be derived from certain strains of *Trichoderma reesei* or *Aspergillus niger*, or their mutants or variants either naturally or artificially induced. As used herein, *Trichoderma reesei* denotes microorganisms known by that name, as well as those microorganisms classified under the names *Trichoderma longibrachiatum* and *Trichoderma viride*. Any cellulase enzyme or enzyme complex that is specific to hydrolysis of cellulose produced by Acetobacter bacteria can be used.

A representative acid cellulase enzyme is the Cellulase Tr Concentrate multi-enzyme acid cellulase complex, which is commercially available from Solvay Enzymes, Inc. Cellulase Tr Concentrate is a food grade cellulase complex obtained by controlled fermentation of a selected strain of *Trichoderma reesei*. This enzyme complex consists of both exoglucanases and endoglucanases that directly attack native cellulose, native cellulose derivatives, and soluble cellulose derivatives. This enzyme complex specifically hydrolyzes the β-D,4-glucosidic bonds of bacterial cellulose, in particular the polymeric bacterial cellulose produced by Acetobacter bacteria, as well as its oligomers and derivatives.

Another representative cellulase enzyme commercially available from Solvay Enzymes, Inc. is Cellulase TRL multi-enzyme liquid cellulase complex. Cellulase TRL cellulose enzyme complex is derived from *Trichoderma reesei* in the same manner as Cellulase Tr Concentrate enzyme complex, but is prepared and sold in liquid form. Its activity against bacterial cellulose has been demonstrated to be equivalent to that of Cellulase Tr Concentrate enzyme complex.

Other suitable enzymes for use in the present invention include Celluzyme Acid P enzyme and Celluclast 1.5L, both commercially available from Novo Nordisk; Multifect™ Cellulase 300 enzyme, commercially available from Genencor International, and Rapidase® Acid Cellulase enzyme, commercially available from Gist-Brocades International B.V. Still other cellulase enzymes or cellulase enzyme complexes are suitable for use in the present invention, provided they exhibit specific hydrolytic activity directed at the β-glucosidic linkage characteristic of the polymeric bacterial cellulose produced by microorganisms such as Acetobacter bacteria.

Where the enzymatic detergent drain cleaners according to the present invention are prepared in dry form, i.e. exclusive of any water added to form a solution, but including any water normally complexed or bound with dry ingredients, the acid cellulase enzyme should be present in an amount of about 0.015% to about 20% by weight, preferably about 0.05% to about 15% by weight, more preferably about 0.5% to about 10% by weight, even more preferably from about 1% to about 8% by weight, still more preferably from about 2% to about 7% by weight, and most preferably 6% by weight. Where the compositions according to the present invention are prepared as aqueous solutions, the acid cellulase enzyme concentration in the solution should be at least about 0.015 g/l, preferably at least about 0.15 g/l, more preferably at least about 0.30 g/l, and still more preferably at least about 0.60 g/l, and most preferably at least 0.85 g/l.

It is to be understood by those of skill in the art that activities of the commercial acid cellulase enzymes recited above for use in the present invention may vary slightly from enzyme to enzyme, and that the assays and substrates of the assays used by the manufacturers of these enzyme products to express their activity vary from manufacturer to manufacturer. Nonetheless, it would be a matter of routine experimentation to determine relative equivalents of each commercial enzyme preparation to be used in the present invention merely by choosing one of the numerous cellulase assay methods known in the art and applying that method uniformly to the commercial preparations.

In the present drain cleaners, compositions and methods, the dissolved carbon dioxide, can be provided by any source, including carbon dioxide gas, carbon dioxide enriched water, and water containing carbon dioxide but, is preferably derived from a system comprising a water-soluble carbonate salt and a water-soluble organic or inorganic acid that under aqueous conditions reacts with one another to generate dissolved carbon dioxide in the aqueous medium. As used herein, the term carbonate salt denotes both carbonate and bicarbonate salts and salts of carbonic acid. Accordingly, suitable water-soluble carbonate salts include lithium carbonate, lithium bicarbonate, sodium and potassium sesquicarbonate, sodium carbonate, sodium bicarbonate, ammonium carbonate, ammonium bicarbonate, potassium carbonate, potassium bicarbonate, calcium carbonate, calcium bicarbonate, magnesium carbonate, and magnesium bicarbonate. Generally acceptable are the carbonate salts of alkali metals (Group IA) and alkaline earth metals (Group IIA).

Any water-soluble organic or inorganic acid can be used in the present invention. Suitable organic acids include, but are not limited to, formic acid, acetic acid, hydroxy acetic acid, propionic acid, butyric acid, valeric acid, caproic acid, lauric acid, palmitic acid, stearic acid, citric acid, tartaric acid, succinic acid, malic acid, uric acid, gluconic acid or its precursor glucono-δ-lactone, polymaleic-acrylic acids, acrylic acids, polyacrylic acids, sebacic acid, maleic acid, benzoic acid, fumaric acid, isophthalic acid, terephthalic acid, suberic acid, pimelic acid, malonic acid, glutaric acid, adipic acid, and lactic acid. Suitable inorganic acids include, but are not limited to hydrochloric acid, hydrofluoric acid, hydrobromic acid, hydroiodic acid, sulfuric acid, sulfamic acid, sulfurous acid, phosphoric acid, phosphorous acid, polyphosphoric acid, hypophosphorous acid, boric acid, sodium bisulfate, and sodium bisulfite.

Various combinations of acids and carbonate salts are suitable for use in the present invention. When dry drain cleaners are prepared according to the present invention, it is preferable to use salts and acids, as well as the other product components, in powder form. Among the disclosed acids, citric acid and sulfamic acid are preferred in an amount of about 10% to about 50% by weight. Citric acid is particularly preferred, since in reacting with the carbonate or bicarbonate salt to form the present compositions, it forms citrate salts, which acts as a "builder" salt, softens the aqueous composition, and contributes a detergent action, further aiding with the decomposition and removal of bacterial cellulose deposits. A particularly preferred combination of acid and salt is citric acid in an amount of about 43% by weight of the composition, sodium carbonate in an amount of about 1% to about 10%, preferably about 5%, by weight of the composition, and sodium bicarbonate in an amount of about 30% to about 50%, preferably about 40%, by weight of the composition, wherein the sodium carbonate in part acts as a buffering agent and pH conditioner.

Where the drain cleaners according to the present invention are prepared in dry form, the water soluble carbonate salt and the water soluble acid each should be present in an amount of about 1% to about 70% by weight, preferably about 10% to about 50% by weight, more preferably about 13% to about 48% by weight, and most preferably about 15% to about 45% by weight. The carbonate salt and acid need not be present in equivalent amounts. The amount of each component necessary to generate a desired concentration of dissolved carbon dioxide gas can easily be calculated by one of ordinary skill in the art based upon the stoichiometry of the ingredients chosen and the conditions under which they are expected to react.

Where the compositions according to the present invention are prepared in solution form, the amounts of carbonate salt and acid should be chosen to ensure a minimum dissolved carbon dioxide concentration of at least 100 ppm, preferably at least about 300 ppm, more preferably at least about 500 ppm, and most preferably at least about 1000 ppm. Without being bound by theory, it is believed that the enriched carbon dioxide environment provided by the present invention mimics the enriched carbon dioxide environment in which the Acetobacter bacteria biosynthesize polymeric bacterial cellulose, thereby creating an environment in which the activity of the cellulase enzyme is greatly and unexpectedly increased.

In preferred drain cleaners, compositions and methods of application, the carbon dioxide gas provides a forced thickened detergent foam, which helps fill the drain pipe environment in which polymeric cellulose deposits typically are found with the enzymatic detergent foam, thereby coating as much as possible of the deposited cellulose with the enzymatic detergent or solution. Further, the carbon dioxide foam, as it slowly collapses, allows the drain cleaner or solution to have a substantially increased contact time with the bacterial cellulose. Several substantially nonfoaming detergent formulations, where bicarbonate salt was substantially or totally eliminated or replaced by sodium chloride or sodium sulfate, were found to be far less effective to degrade bacterial cellulose, even after 2 weeks long of soaking in a beaker test. By contrast, the detergent foams according to the present invention typically degrade bacterial cellulose completely down after soaking for about twenty-four hours in the beaker test.

In addition to the enzyme and carbon dioxide or carbon dioxide generating system, the drain cleaners and compositions of the present invention may also include an organic or inorganic thickening agent. The thickener acts to cling the active ingredients to the cellulose surface, affording increased contact time and thereby enhancing the efficacy of enzymatic degradation of cellulose.

The organic thickening agent of the present invention may be any of a wide variety of organic thickening agents known to those skilled in the art. Particularly preferred are the crosslinked polyacrylic acid-type thickening agents, present in an amount of about 1% to about 5% by weight. As used herein, "polyacrylic acid-type" is intended to refer to water soluble homopolymers of acrylic acid or methacrylic acid or water-dispersible or water-soluble salts, esters and amides thereof, or water-soluble copolymers of these acids or their salts, esters or amides with each other or with one or more ethylenically unsaturated monomers, such as styrene, maleic acid, maleic anhydride, 2-hydroxyethylacrylate, acrylonitrile, vinyl acetate, ethylene, propylene, or the like.

Preferably, the polyacrylic thickening agent is one of the crosslinked polyacrylic acid-type thickening agents commercially available from B.F. Goodrich under the CARBOPOL™ trademark. The CARBOPOL™ resins, also known as carbomer resins, are hydrophilic, high molecular weight, crosslinked acrylic acid polymers having an average equivalent weight of about 76 and a general structure of the formula:

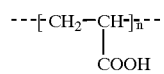

The CARBOPOL™ resins are crosslinked with a polyalkenyl polyether, such as a polyalkyl ether of sucrose having an average of 5.8 alkyl groups per molecule of sucrose. Preferred thickening agents for the present invention include organic polymer thickening agents such as the Carbopol EZ-1™, Carbopol EZ-2™, and Carbopol EZ-ultra™ polymeric thickening agents, which are commercially available from the BF Goodrich Company. Other suitable carbomer thickening agents include the PNC carbomers sold commercially by 3V Inc.

Further suitable organic thickening agents include acrylic copolymers such as the Acusol® polymers sold commercially by Rohm & Haas Company, carboxyvinyl polymers such as the Neutragel™ and Polygel™ polymers sold commercially by 3V Inc., polyacrylate polymers such as the Burco Thix PCS™ polymer sold commercially by Burlington Chemical Co., Inc., and poly(methylvinylether/maleic) anhydride polymers such as Gantrez® polymer sold commercially by International Specialty Products.

Further examples of suitable organic thickeners which can be used in the present invention include Guar gum sold as "Supercol" by Aqualon, Guar hydroxy propyltrimonium chloride sold as "Hi-Care 1000" by Alcolac, corn starch, and urethane associative thickeners sold as "NOPCO" by Henkel Corporation.

Still other suitable organic thickeners include fatty acid thixotropic thickeners such as higher aliphatic fatty monocarboxylic acids having from about 8 to about 22 carbon atoms, inclusive of the carbon atom of the carboxyl group of the fatty acid. The aliphatic radicals are saturated and can be straight or branched. Mixtures of fatty acids may be used, such as those derived from natural sources, such as tallow fatty acid, coco fatty acid, soya fatty acid, etc., or from synthetic sources available from industrial manufacturing processes.

Examples of the fatty acids which can be used as thickeners include, for example, decanoic acid, lauric acid, dodecanoic acid, palmitic acid, myristic acid, stearic acid, oleic acid, eicosanoic acid, tallow fatty acid, coco fatty acid, soya fatty acid and mixtures of these acids. The metal salts of the above fatty acids can also be used in the present invention as thixotropic thickener agents, such as salts of the monovalent and polyvalent metals such as sodium, potassium, magnesium, calcium, aluminum and zinc.

Many of the metal salts are commercially available. For example, the aluminum salts are available in the triacid form, e.g., aluminum stearate as aluminum tristearate, $Al(OCOC_{17}H_{35})_3$. The monoacid salts, e.g., aluminum monostearate, $Al(OH)_2(OCOC_{17}H_{35})$ and diacid salts, e.g. aluminum distearate, $Al(OH)(OCOC_{17}H_{35})_2$, and mixtures of two or three of the mono-, di- and triacid salts can be used for those metals, e.g. Al, with valences of +3, and mixtures of the mono- and diacid salts can be used for those metals, e.g. Zn, with valences of +2.

The thickening agent used in the present invention also may be any one of a number of natural or synthetic inorganic materials, such as clays, silicas, aluminas, titanium dioxide (pyrogenic) and calcium and/or magnesium oxides. All of these materials are readily available from commercial sources.

Various types of clays which are useful include kaolins such as kaolinite, dicktite, nacrite, halloysite and endillite; serpentine clays such as chrysotile and amesite; smectites such as montmorillonite (derived from bentonite rock), beidellite, nontronite, hectorite, saponite and sauconite; illites or micas; glauconite; chlorites and vermiculites; attapulgite and sepiolite. Mixed layer clays exhibiting intercalation of mineral sandwiches with one another may be used, such as, for example, mixed-layer clay mineral sheets of illite interspersed randomly or regularly with montmorillonite, or chlorite with one of the other types of clay, such as vermiculite. Other useful clays include amorphous clays, such as allophane and imogolite, and high-alumina clay minerals such as diaspore, boehmite, bibbsite and cliachite. Various types of silicas which are useful include diatomite, precipitated silica and fumed silica. Various types of aluminas may be used, as well as various types of calcium and magnesium oxides.

Suitable smectite thickening agents include the Aquamont, Gelwhite®, and Mineral Colloid™ montmorillonite thickeners commercially sold by Southern Clay Products, the Bentolite® bentonite thickener commercially sold by Southern Clay Products, the Bentone EW and Bentone LT hectorite thickeners commercially sold by Rheox, Inc., and the Laponite® hectorite thickener commercially sold by Southern Clay Products. Other acceptable inorganic thickeners include attapulgite clays, such as the Attagel attapulgite thickeners commercially sold by the Engelhard Minerals and Chemicals Corporation. Still other acceptable inorganic thickeners include fumed silicas, such as the Aerosil® fumed silicas sold commercially by Degussa Corporation and the Cab-O-Sil® and Cab-O-Sperse® fumed silicas sold commercially by Cabot Corporation, and silicon dioxides, such as Sipernat 22LS silicon dioxide sold commercially by Degussa Corporation Pigments Division. The thickening agent of the invention also can be selected from a group of complex magnesium aluminum silicates derived from natural smectite clays by a proprietary refining process and sold by R. T. Vanderbilt Company, Inc. under the trademarks VEEGUM® and VAN GEL®.

Where the enzymatic detergent drain cleaners according to the present invention are prepared in dry form, the thickener should be present in an amount of at least about 0.05% to about 5% by weight, preferably at least about 0.1% to about 4% by weight, more preferably at least about 0.5% to about 3%, and most preferably at least about 1% to about 2%. Where the compositions of the present invention are prepared in solution form, the thickener should be present in a concentration of at least about 0.01 g/l, preferably at least 0.15 g/l, more preferably at least about 0.20 g/l, and most preferably at least about 0.30 g/l.

The drain cleaners and compositions of the present invention also may include a surfactant which assists in the formation of a thickened foam with the carbon dioxide gas. A wide variety of surfactants can be used in the present invention, selected from nonionic, cationic, anionic, or amphoteric surfactants.

Examples of nonionic surfactants that can be employed are alkoxylated alkyl phenols, amides, amines, ethoxylated or propoxylated higher aliphatic alcohols, alkyl polyglucosides, alkyl polysaccharides and sulfonamides. These well known surfactants include sorbitan esters of $C_{10}$ to $C_{22}$ fatty acids, polyoxyethylene sorbitan esters of $C_{10}$ to $C_{22}$ fatty acids, polyoxyethylene sorbitol esters of $C_{10}$ to $C_{22}$ fatty acids, polyoxyethylene derivatives of $C_6$ to $C_{20}$ fatty phenols, and polyoxyethylene condensates of $C_{10}$ to $C_{22}$ fatty acids or fatty alcohols. Polyoxyethylene and polyoxypropylene analogs of the above surfactants also can be used in the present invention.

Commercially available nonionic surfactants suitable for use in this invention are Shell Neodol™ 91-6 and Shell Neodol™ 91-2.5 surfactants. Neodol™ 91-6 surfactant is a polyethylene glycol ether of a mixture of synthetic $C_{9-11}$ fatty alcohols with an average of 6 moles of ethylene oxide. Neodol™ 91-2.5 surfactant is an ethoxylated alcohol of a mixture of synthetic $C_{9-11}$ fatty alcohols with an average of 2.5 moles of ethylene oxide.

Other useful nonionic surfactants available from Shell are the Neodol 25-7 and Neodol 25-6.5 surfactants. The former is a condensation product of a mixture of higher fatty alcohols averaging about 12 to 15 carbon atoms, with about 7 moles of ethylene oxide and the latter is a corresponding mixture wherein the carbon atom content of the higher fatty alcohol is 12 to 15 and the number of ethylene oxide groups present averages about 6.5. The higher alcohols are primary alkanols. Other examples of such detergents include Tergitol® 15-S-7 and Tergitol® 15-S-9 surfactants, both of which are linear secondary alcohol ethoxylates made by Union Carbide Corp. The former is a mixed ethoxylation product of 11 to 15 carbon atoms linear secondary alkanol with seven moles of ethylene oxide and the latter is a similar product but with nine moles of ethylene oxide being reacted.

Another suitable nonionic surfactant is available from Union Carbide Corporation under the trademark Tergitol® MDS-42. This nonionic surfactant is a $C_{12}$–$C_{14}$ linear alcohol containing 55% by weight random distributed oxyalkyl groups of which 42% are ethoxy and 58% propoxy groups. Another nonionic surfactant that can be used is Alfonic 18-57 surfactant, made by Vista Chemical Company. Other useful nonionic surfactants are the Poly-Tergent S-LF surfactants available from Olin Corporation. These surfactants are alkoxylated linear fatty alcohols. Surfactants of this type are available under the tradenames Poly-Tergent S-LF 18, Poly-Tergent S-305-LF, Poly-Tergent S-405-LF and Poly-Tergent CS-1. Another liquid nonionic surfactant that can be used is sold under the tradename Lutensol SC 9713.

Synperonic nonionic surfactant from ICI such as LF/D25 surfactant are nonionic surfactants that can be used in the detergent compositions of the instant invention. Also useful in the present compositions are higher molecular weight nonionic surfactants, such as Neodol 45-11 surfactant by Shell, which are similar ethylene oxide condensation products of higher fatty alcohols, with the higher fatty alcohol being of 14 to 15 carbon atoms and the number of ethylene oxide groups per mole being about 11. Such products are also made by Shell Chemical Company.

Still other examples of suitable nonionic surfactants include polyoxyethylene and/or polyoxypropylene condensates of aliphatic carboxylic acids, aliphatic alcohols and alkyl phenols; polyoxyethylene derivatives of sorbitan mono-,di-, and tri-fatty acid ester and polyoxyethylenepolyoxypropylene block polymers.

Further examples of suitable nonionic surfactants include alkylpolyglucoside surfactants such as disclosed in U.S. Pat. No. 5,169,553, the disclosure of which is incorporated herein by reference. These surfactants are derived from corn starch, a cellulose with α-linkages between glucose units, and coconut oil.

Still other examples of suitable nonionic surfactants include alkylpolysaccharide surfactants such as disclosed in U.S. Pat. No. 5,169,553, the disclosure of which is incorporated herein by reference.

Other suitable nonionic surfactants include ethoxylated propoxylated fatty alcohols, which are possibly capped, characterized by the presence of an organic hydrophobic group and an organic hydrophilic group and typically produced by the condensation of an organic aliphatic or alkyl aromatic hydrophobic compound with ethylene oxide and/or, propylene oxide (hydrophilic in nature). Practically any hydrophobic compound having a carboxy, hydroxy, amido or amino group with a free hydrogen attached to the nitrogen or oxygen can be condensed with ethylene oxide or with the polyhydration product thereof, polyethylene glycol, to form a nonionic detergent. The length of the hydrophilic or polyoxyethylene chain can be readily adjusted to achieve the desired balance between the hydrophobic and hydrophilic groups.

The useful nonionic surfactants also include polyalkoxylated lipophiles wherein the desired hydrophile-lipophile balance is obtained from addition of a hydrophilic poly-lower alkoxy group to a lipophilic moiety. Examples include poly-lower alkoxylated higher alkanols wherein the alkanol is of 9 to 18 carbon atoms and wherein the number of moles of lower alkylene oxide (of 2 or 3 carbon atoms) is from 3 to 12.

Useful nonionic surfactants are represented by the Plurafac series from BASF Chemical Company which are the reaction product of a higher linear alcohol and a mixture of ethylene and propylene oxides, containing a mixed chain of ethylene oxide and propylene oxide, terminated by a hydroxyl group. Examples include a $C_{13}$–$C_{15}$ fatty alcohol, condensed with 7 moles propylene oxide and 4 moles ethylene oxide, and a $C_{13}$–$C_{15}$ fatty alcohol, condensed with 5 moles propylene oxide and 10 moles ethylene oxide. Acceptable commercial products include the Plurafac LF132 and Plurafac LF231 surfactants sold by BASF. Other suitable nonionic surfactants include sorbitol monolaurate propylene oxide condensates, sorbitol monomyristate propylene oxide condensates, sorbitol monostearate propylene oxide condensates, dodecyl phenol propylene oxide condensates, myristyl phenol propylene oxide condensates, octyl phenyl propylene oxide condensates, nonyl phenyl propylene oxide condensates, stearyl phenol propylene oxide condensates, lauryl alcohol propylene oxide condensates stearyl alcohol propylene oxide condensates, secondary alcohol propylene oxide condensates such as $C_{14}$–$C_{15}$ secondary alcohols condensed with propylene oxide, sorbitan tristearate condensed with propylene oxide, sorbitan trioleate condensed with propylene oxide, and sorbitan trioleate.

Anionic surfactants useful in this invention generally include alkali metal, ammonium and magnesium salts of alpha olefin sulfonates, alkyl sulfonates, alkyl aryl sulfonates, alkyl aryl ether sulfates, alkyl ether sulfates, sulfated alcohol ethoxylates, taurates, petroleum sulfonates, alkyl napthalene sulfonates, alkyl sarcosinates and the alkyl sulfosuccinates.

Anionic surfactants useful in the present invention are the linear or branched alkali metal mono- and di($C_{8-14}$)alkyl diphenyl oxide mono- and disulfonates, commercially available from Dow Chemical, for example as the DOWFAX™

3B-2 and DOWFAX™ 2A-1 surfactants. Other suitable surfactants include the primary alkylsulfates, alkylsulfonates, alkylarylsulfonates, sec-alkylsulfates and olefin sulfonate. Examples include sodium $C_{10}$–$C_{18}$ alkanesulfonates such as sodium lauryl sulfonate, sodium hexadecylsulfonate, sodium dodecyl sulfate, sodium and tallow alcohol sulfate, and sodium $C_{12}$–$C_{18}$ alkylbenzenesulfonates such as sodium dodecylbenzenesulfonates. The corresponding potassium and magnesium salts may also be employed.

Specific anionic surfactants useful in this invention include sodium lauryl sulfonate, ammonium lauryl sulfonate, dodecyl benzene sulfonate, sodium lauryl ether sulfate, diethanolamine lauryl sulfate, ammonium salts of sulfated alcohol ethoxylates, sodium cocoyl isethionate, sodium N-methyl-N-oleoyl taurate, sodium N-methyl-N-cocyl taurate, triethanolamine lauryl sulfate, disodium monooleamide PEG-2 sulfosuccinate, petroleum sulfonates sodium salt, alkyl napthalene sodium sulfonates, sodium lauroyl sarcosinate, and sodium alkyl sulfosuccinate. Other useful anionic surfactants include sodium or potassium dodecyl sulfate, sodium trioleate, sodium or potassium stearyl sulfate, sodium or potassium dodecyl benzene sulfonate, sodium or potassium stearyl sulfonate, triethanol amine salt of dodecyl sulfate, sodium laurate, sodium or potassium myristate, and sodium or potassium stearate. Sodium dodecyl benzene sulfonate powder, sold by Stepan Chemical Company as Nacconol 90G surfactant, is preferred.

Other suitable surfactants useful herein include the amine oxide surfactants of the structure $R_2R_1NO$ in which $R_2$ and $R_1$ each represents a lower alkyl group, for instance, a lower alkyl, or a long chain alkyl group having from 8 to 22 carbon atoms, for instance a lauryl, myristyl, palmityl or cetyl group. Instead of an amine oxide, a corresponding surfactant phosphine oxide $R_2R_1PO$ or sulfoxide $R_2R_1SO$ can be employed. Betaine surfactants are typically of the $R_3R_4N^+R_5COO^-$, in which $R_3$ and $R_4$ each represents a lower alkylene group having from 1 to 5 carbon atoms and $R_5$ represents a long chain alkyl group having from 8 to 22 carbon atoms. Specific examples of the amino oxide surfactants are lauryldimethylamine oxide, myristyldimethylamine oxide, the corresponding phosphine oxides and sulfoxides, and the corresponding betaines, including dodecyldimethylammonium acetate, tetradecyldiethylammonium pentanoate, hexadecyldimethylammonium hexoanoate and the like.

Cationic surfactants useful in this invention include, e.g., the quaternary ammonium surfactants such as $C_{10}$ to $C_{22}$ fatty ammonium compounds having 10 to 22 carbon atoms, $C_{10}$ to $C_{22}$ fatty morpholine oxides, propylene oxide condensates of $C_{10}$ to $C_{22}$ fatty acid monoesters of glycerins, the mono- or diethanol amides of $C_{10}$ to $C_{22}$ fatty acids, and alkoxylated siloxane surfactants containing ethylene oxide units and/or propylene oxide units. As is known in the surfactant art, the counter ion for quaternary ammonium surfactants is usually a halide, sulfate, or methylsulfate, the chlorides being the most common industrially available compounds.

Other suitable cationic surfactants suitable for use in the present invention include straight chain alkyl fatty amines, quaternary ammonium salts, alkyl-substituted quaternary ammonium salts, alkylaryl-substituted quaternary ammonium salts, quaternary imidazolinium salts, amine oxides, fatty amine oxides, tri-fatty amine oxides, tri-quaternary phosphate esters, amphoglycinate phosphates, amine acetates, long chain amines and their salts, diamines and their salts, polyamines and their salts, polyoxyethylenated long chain amines, and quaternized polyoxyethylenated long chain amines.

Specific cationic surfactants useful in the present invention include decyldimethyl amine oxide, cocoamidodimethyl amine oxide, trimethyldodceylammonium chloride, and trimethylstearylammonium methylsulfate. Suitable, commercially available cationic surfactants include the surfactant sold under the trademark Q-17-2™ and the AO-3, 8™ surfactant by the Exxon Chemical Company, Varisoft™ 222 and Arosurf™ TA-100 surfactants by the Witco Chemical Company, and Ninox L™ surfactant by the Stepan Chemical Company. Q-17-2™ surfactant by the Exxon Chemical Company is a 75% by weight aqueous solution of isotridecyloxypropyl dihydroxyethylmethylammonium chloride. The Exxon AO-3,8™ surfactant is a proprietary tertiary eight-carbon amine oxide. The Varisoft™ 222 surfactant is a diamidoamine-based quaternary with a formula of methylbis(tallow amidoethyl)2-hydroxyethyl-ammonium methyl sulfate. The Arosurf™ TA-100 surfactant is a dialkyldimethyl quaternary with the chemical composition of distearyldimethylammonium chloride. The Ninox-L™ surfactant is a lauryldimethyl amine oxide.

Amphoteric surfactants useful in this invention generally include betaines, sultaines, imidazoline derivatives and the like. Specific amphoteric surfactants useful in this invention include ricinoleamidopropyl betaine, cocamidopropyl betaine, stearyl betaine, stearyl amphocarboxy glycinate, sodium lauraminopro-pionate, cocoamidopropyl hydroxy sultaine, disodium lauryliminodipropionate, tallowiminodipropionate, cocoampho-carboxy glycinate, cocoimidazoline carboxylate, lauric imidazoline monocarboxylate, lauric imidazoline dicarboxylate, lauric myristic betaine, cocoamidosulfobetaine, alkylamidophospho betaine and the like. Other useful amphoteric surfactants include decyl amino betaine; coco amido sulfobetaine, oleyl amido betaine, coco imidazoline, coco sulfoimidazoline, cetyl imidazoline, 1-hydroxyethyl-2-heptadecenyl imidazoline, 1-hydroxyethyl-2 mixed heptadecenyl heptadecadienyl imidazoline, and n-coco morpholine oxide. Suitable, commercially available amphoteric surfactants include Miranol™ FBS surfactant by Rhone-Poulenc and Mackalene™ 316 surfactant by McIntyre Chemical Company. The Miranol™ FBS surfactant is a 39% by weight aqueous solution of disodium cocoampho dipropionate. The Mackalene™ 316 surfactant is a stearamidopropyl dimethylamine lactate.

Any combination of nonionic, cationic, anionic, or amphoteric surfactants can be used in the present invention. It may be preferable in certain embodiments of the present invention to include a mixture of surfactants. In all embodiments, the surfactant selected should be effective to enhance formation of a thickened foam with the dissolved carbon dioxide gas. Where the enzymatic detergent drain cleaners of the present invention are prepared in dry form, the surfactant should be present in an amount of at least about 0.1% to about 10% by weight, preferably about 0.5% to about 8% by weight, more preferably about 1% to about 6% by weight, and most preferably about 2% to about 5% by weight. Where the compositions of the present invention are in solution form, the surfactant should be present in the solution in a concentration of at least about 0.05 g/l, preferably at least about 0.25 g/l, more preferably at least about 0.50 g/l, and most preferably at least about 1.0 g/l.

The effective pH range of the present drain cleaner and composition is about 2.0 to about 7.0, preferably about 3.5 to about 6.5, and more preferably about 4.0 to about 5.5.

Maintenance of the pH within these ranges is accomplished by providing, if necessary, any of the pH conditioners and buffering agents well known to the art and compatible with the other elements of the drain cleaner or composition.

The effective temperature range is up to about 60° C. (140° F.), preferably about 40° to about 55° C., and more preferably about 40° to about 50° C. (about 104° to about 122° F.).

The method of the present invention generally comprises contacting an aqueous system in need of bacterial cellulose removal or prevention with the present enzymatic detergent drain cleaners or compositions under aqueous conditions for a sufficient time to at least partially hydrolyze the bacterial cellulose, whereby the at least partially hydrolyzed material is removed from the aqueous system.

The method of the present invention requires no particular mode of contacting the enzymatic drain cleaner or composition with the cellulose deposit desired to be removed, provided the contact takes place for a time sufficient to allow at least partial hydrolysis, such that the cellulosic materials can be removed with minimal mechanical or manual effort, such as by flushing or rinsing with tap water, by gentle mechanical agitation, or by continued use of the aqueous system being treated. Preferably, the drain cleaner or composition is permitted to contact the deposits for at least two to three hours. When the present drain cleaners or compositions have sufficient contact time with the deposits, hydrolysis will result in production of water soluble glucose, and its oligomers which is easily rinsed without any mechanical action needed.

The drain cleaners, compositions, and methods of the present invention can be applied to effect both prevention and removal of bacterial cellulose deposits. When used to clean drain pipes, such as soft drink and alcoholic beverage station drain pipes, the condition of the drain must be ascertained, i.e. whether the drain is fully or partially clogged. If fully clogged, the drain can be partially unblocked, typically by mechanical means such as snaking, rotor rooting, water jetting, etc., to allow the enzymatic detergent drain cleaner or composition to contact as much of the deposited cellulose as possible.

In one embodiment of the present method used to remove or prevent bacterial cellulose in an aqueous drain system, a dry enzymatic enzymatic detergent drain cleaner according to the present invention is added directly to a drain system through an opening in the system, such as a floor drain or any other opening that will allow access to the drain interior. Following addition of the dry product to the drain, an aqueous solution of the drain cleaner is formed in the drain by adding an aqueous medium to the drain. Preferably, the aqueous medium is hot, up to about 60° C., preferably between about 40° and about 55° C., and more preferably between about 40° and about 50° C. The resultant aqueous enzymatic solution is allowed to disperse throughout the drain system, where it contacts the bacterial cellulose deposits.

In a preferred method, the drain system is substantially closed after the dry composition is added but before the aqueous medium is added. Upon addition of the aqueous medium, the carbonate salt and acid react to form carbon dioxide, and the resultant pressure buildup in the drain in the vicinity of the reaction forces the enzymatic solution throughout the drain system and into contact with the deposited bacterial cellulose.

In another embodiment of the present method, the dry enzymatic drain cleaner of the present invention is mixed with a hot aqueous medium in a vessel to form a composition comprising an aqueous enzymatic solution, which is simply added to an aqueous system in need of removal or prevention of bacterial cellulose deposits. In a more preferred method for use in treating aqueous drain systems, the vessel is the reservoir of a hand-held liquid spray apparatus, such as the Spray Doc® pressure sprayer with spray tip removed, manufactured by the Gilmour Manufacturing Co., Somerset, Pa. The resultant enzymatic solution is then applied with the spray apparatus in accordance with the manufacturer's instructions directly to the drain system in need of treatment.

The following examples are illustrative only, and are not intended to limit or otherwise circumscribe the claimed invention. One skilled in the art can make, without undue experimentation, various insubstantial substitutions and variations by equivalent means, without departing from the spirit or teaching of this invention. Similarly, although preferred embodiments of the invention are described herein in detail, one of skill in the art can make variations to those embodiments without departing from the spirit of the invention or the scope of the claims.

EXAMPLE 1

PREPARATION OF POWDERED ENZYMATIC DETERGENT DRAIN CLEANER

A powdered enzymatic detergent drain cleaner product can be prepared in any suitable mixing device. For example, a twin-shelled or Hobert mixer can be used, but a ribbon mixer also is suitable. Desired amounts of citric acid, sodium carbonate, powdered Nacconol 90G surfactant, sodium bicarbonate, Carbopol thickener, and Cellulase Tr Concentrate were weighed and set aside. The mixer was charged with the citric acid and sodium carbonate, which were mixed several minutes. When these two ingredients are thoroughly mixed, the Nacconol surfactant was added and allowed to mix for several more minutes, followed by the sodium bicarbonate addition and several more minutes of mixing. Next the Carbopol thickener was added and allowed to mix, followed by the Cellulase Tr Concentrate enzyme. All the ingredients having been added, the mixture was allowed to mix for at least five minutes until a free-flowing powder was obtained. The above order of addition is not critical to the function of the product, but avoids dust formation during the mixing procedure.

EXAMPLE 2

ENZYMATIC DETERGENT DRAIN CLEANER FORMULATIONS

The following are examples of dry compositions prepared according to the present invention. All amounts are expressed as weight percentages.

| Ingredients | 102-34-8 | 102-34-9 | 102-34-10 | 102-51-4 | 102-32-3 |
|---|---|---|---|---|---|
| Sulfamic Acid | 40 | 20 | — | — | 38 |
| Citric Acid | — | 20 | 40 | 43 | 8 |
| Sodium Bicarbonate | 40 | 40 | 40 | 40 | 34 |
| Sodium Carbonate | 5 | 5 | 5 | 5 | 5 |
| Nacconol 90G | 10 | 10 | 10 | 5 | 6 |

-continued

| Ingredients | 102-34-8 | 102-34-9 | 102-34-10 | 102-51-4 | 102-32-3 |
|---|---|---|---|---|---|
| Carbopol EZ-2 | 1 | 1 | 1 | 1 | 3 |
| Cellulase Tr | 4 | 4 | 4 | 6 | 6 |
| Concentrate | 100% | 100% | 100% | 100% | 100% |

EXAMPLE 3

NON-FOAMING ENZYMATIC DRAIN CLEANER

The following Table compares a dry enzymatic detergent drain cleaner formulation of a foaming cleaner prepared according to this invention (102-44-0) with three non-foaming cleaners (102-46-2, 102-46-3, and 102-46-4), wherein the sodium bicarbonate was replaced with sodium chloride (102-46-2), sodium sulfate (102-46-3), or additional citric acid and sodium citrate.

| Ingredients | 102-44-0 | 102-46-2 | 102-46-3 | 102-46-4 |
|---|---|---|---|---|
| Citric Acid | 40 | 20 | 20 | 35 |
| Sodium Citrate | — | 20 | 20 | 35 |
| Sodium Carbonate | 5 | 5 | 5 | 10 |
| Sodium Bicarbonate | 40 | — | — | — |
| NaCl | — | 40 | — | — |
| $Na_2SO_4$ | — | — | 40 | — |
| Nacconol 90G | 10 | 10 | 10 | 10 |
| Carbopol EZ-1 | 1 | 1 | 1 | 2 |
| Cellulase Tr | 4 | 4 | 4 | 8 |
| Concentrate | 100% | 100% | 100% | 100% |

Performance of Formulations 102-46-2 and 102-46-3 was very poor on hydrolysis of bacterial cellulose. Very little degradation occurred even after two weeks of soaking cellulose with these formulations, whereas with formula 102-44-0, complete degradation occurred with overnight treatment. Performance of Forumulation 102-46-4 is acceptable, but slightly slower than Formulation 102-44-0.

EXAMPLE 4

Carbon Dioxide Solubility Calculations

Objective

To determine the amount of carbon dioxide ($CO_2$) gas in both the liquid phase and the gas phase when solutions of enzymatic detergent drain cleaner according to the present invention are prepared at various concentrations and temperatures.

Theory

Reaction of the dry product components in water in a closed container produces carbon dioxide, which exerts a measurable pressure on the container walls. Where the dry formulation comprises citric acid, sodium bicarbonate, and sodium carbonate to form the carbon dioxide, the general reaction scheme is as follows:

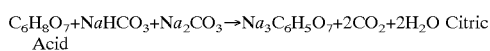
$C_6H_8O_7 + NaHCO_3 + Na_2CO_3 \rightarrow Na_3C_6H_5O_7 + 2CO_2 + 2H_2O$ Citric Acid The total pressure exerted on the container walls is the sum of three partial pressures: atmospheric pressure; water pressure ($P_{water}$); and carbon dioxide pressure ($P_{carbon\ dioxide}$). Because the atmospheric pressure is equal both inside and outside the container, the gauge pressure of the vessel measures the sum ($P_{Total}$) of the partial pressures of water and carbon dioxide. Thus, according to Dalton's Law, $$P_{Total} = P_{water} + P_{carbon\ dioxide}.$$

Under the conditions of this trial (high specific volume and dilute gas solution), both the Ideal Gas relation and Henry's Law are valid and thus can be used to calculate the amount of carbon dioxide gas dissolved in the liquid solution. The vapor pressure of water at system conditions is determined by the Antoine equation and is available from, for example, Perry's Chemical Engineering Handbook or the CRC Handbook of Chemistry and Physics.

Experimental Procedure

For the closed system, a pressure sprayer having a 12 liter capacity (Model 301P by the Gilmour Mfg. Co.) was modified by removing the spray nozzle from the delivery tube and replacing it with a liquid dampened, factory calibrated, 0–30 psig pressure gauge (Ametek, U.S. Gauge Division). Powdered enzymatic detergent drain cleaner was prepared according to formula 102-51-4 in Example 2 and weighed into one ounce, two ounce, three ounce, four ounce, and six ounce samples. After weighing, the samples were sealed in water-soluble polyvinyl alcohol film packages.

Prior to each run, the container was washed thoroughly with one to two gallons of detergent solution (approximately 1 oz./gal.) and rinsed thoroughly three times with tap water. After cleaning, the container was charged with four liters of tap water heated to a specified temperature, leaving eight liters of head space. The desired packaged amount of dry product was dropped into the charged container, and the pump/cap assembly was fastened and sealed tightly onto the container.

After charging and sealing, the container was shaken for about five seconds at half-minute intervals while the dispenser valve was held open, until the PVA package broke, its contents reacted, and the internal pressure of the container stabilized. Stabilization was determined when three consecutive identical readings were obtained at one minute intervals. After the stabilized pressure was recorded, the container was emptied, cleaned, and rinsed to prepare it for the next run.

Sample Calculation

Using the recorded gauge pressure, the carbon dioxide concentration in the liquid and gas phases was calculated. The following is a sample calculation for Experiment No. 6 in the Table that follows, wherein two ounces of dry product is dissolved in four liters of tap water at 110° F.

When reacted under aqueous conditions, 100 g of formula 102-51-4 will produce 0.5704 moles or 12.78 liters of carbon dioxide gas at standard temperature and pressure (0° C. and 760 mm Hg; STP). Thus, two ounces (56.70 g) will produce 7.25 liters (0.32 moles) irn an eight liter volume (the head space in the container; $V_{Exp}$). This volume of gas will cause some of the carbon dioxide to be dissolved in the liquid (solution) phase.

Assuming X to be the volume of gas in liters at STP dissolved into the liquid phase, then (7.25-$_\chi$) liters ($V_{STP}$) of carbon dioxide remain in the gas phase. The partial pressure of water ($P_{water}$) at 110° F. ($T_{Exp}$) is 65.82 mm Hg (CRC Handbook). The measured stabilized pressure ($P_{Total}$) was 9.5 psig, or 491.16 mm Hg. Using the Ideal Gas Law, the partial pressure of carbon dioxide at experimental conditions ($P_{carbon\ dioxide}$) can be expressed thus:

$$P_{carbon\ dioxide} = P_{STP} \times \frac{T_{Exp}}{T_{STP}} \times \frac{V_{STP}}{V_{Exp}}$$

$$= 760\ mm\ Hg \times \frac{313.3°\ K}{273°\ K} \times \frac{(7.25 - \chi)l}{8l}$$

Substituting $P_{carbon\ dioxide}$ into Dalton's Law, $$P_{Total} = P_{water} + P_{carbon\ dioxide}$$

$$491.6\ mm\ Hg = 65.82\ mm\ Hg + 760\ mm\ Hg \times \frac{313.3°\ K}{273°\ K} \times \frac{(7.25 - \chi)l}{8l}$$

Thus, $$(7.25 - \chi)l = \frac{(4.91.16 - 65.82)mm\ Hg}{760\ mm\ Hg} \times \frac{273°\ K}{313.3°\ K} \times 8l$$

$$(7.25 - \chi)l = 3.8643l$$

$$\chi = 3.382l,\ or\ 1660\ ppm$$

$$= volume\ of\ CO_2\ in\ 4l\ of\ liquid\ phase\ at\ STP$$

The following Table summarizes the results obtained for amounts of dry product varying from one to six ounces dissolved in four liters of hot water at temperatures ranging from 110° F. to 138° F.

EXAMPLE 5

A field test was conducted wherein drain cleaners and compositions according to the present invention were applied in a quick service restaurant soft drink station drain system clogged with polymeric bacterial cellulose. The enzymatic aqueous solutions were prepared by adding a dry enzymatic detergent drain cleaner directly to the drains in need of treatment, followed by hot water, and allowing the resulting enzymatic detergent solution to develop on the surface of the cellulose deposits in the drain. By substantially sealing the drain at the point of application, the rapid generation of carbon dioxide gas and foam formed by the water contacting the dry ingredients forced the product into the drain system and into contact with the polymeric cellulose deposits. Following treatment, the degraded cellulose deposits were removed by flushing the drains with water.

The test facility had two drink stations, one each at the front counter and the drive-through, serviced by a three inch PVC drain. The drain for the drink stations serviced those stations only, terminating in a floor drain at each station. This branch fed into a drain header, which in turn fed into the main building drain.

Just upstream of the junction with the header, a two foot section of the pipe was sawed out before treatments began to determine the initial condition of the exposed drain. The cellulose deposited in the pipe appeared in cross section to Formulation 102-51-4, Packaged in Sealed Water Soluble PVA Film
$CO_2$ Gas Generated in The Pressurized Closed Dispenser From Dissolution of Powdered Detergent

| Experiment Sequence | Amount of Detergent Used | Temperature of Water Used | Temperature of Detergent Solution | Theoretical Moles of $CO_2$ Produced at STP | Total Theoretical Amount of $CO_2$ Produced at STP |
|---|---|---|---|---|---|
| 1. | 1 oz. (28.35 g) | 138° F. (58.89° C.) | 126° F. (52.22° C.) | 0.16M | 3.62 L |
| 2. | 3 oz. (85.05 g) | 138° F. (58.89° C.) | 126° F. (52.22° C.)** | 0.49M | 10.87 L |
| 3. | 6 oz. (170.10 g) | 138° F. (58.89° C.) | 126° F. (52.22° C.) | 0.97M | 21.73 L |
| 4. | 4 oz. (113.40 g)*** | 120° F. (48.89° C.) | 110° F. (43.33° C.) | 0.65M | 14.49 L |
| 5. | 1 oz. (28.35 g) | 120° F. (48.89° C.) | 110° F. (43.33° C.) | 0.16M | 3.62 L |
| 6. | 2 oz. (56.70 g) | 120° F. (48.89° C.) | 110° F. (43.33° C.) | 0.32M | 7.25 L |
| 7. | 3 oz. (85.05 g) | 120° F. (48.89° C.) | 110° F. (43.33° C.) | 0.49M | 10.87 L |
| 8. | 4 oz. (113.40 g) | 120° F. (48.89° C.) | 110° F. (43.33° C.) | 0.65M | 14.49 L |
| 9. | 6 oz. (170.10 g) | 120° F. (48.89° C.) | 110° F. (43.33° C.) | 0.97M | 21.73 L |
| 10. | 1 oz. (28.35 g) | 110° F. (43.33° C.) | 102° F. (38.89° C.) | 0.16M | 3.62 L |
| 11. | 3 oz. (85.05 g) | 110° F. (43.33° C.) | 102° F. (38.89° C.) | 0.49M | 10.87 L |
| 12. | 6 oz. (170.1 g) | 110° F. (43.33° C.) | 102° F. (38.89° C.) | 0.97M | 21.73 L |

| Experiment Sequence | Known Water Vapor Pressure at Solution Temperature ($P\ H_2O$) | Total Experimental Pressure* Produced at Ambient ($P\ CO_2 + P\ H_2O$) | Calculated (from Experimental Amount of $CO_2$ Remained in The Gas Phase in 8L Head Space at STP | Calculated (from Experimental) Amount of $CO_2$ Dissolved in The 4 L Solution at STP |
|---|---|---|---|---|
| 1. | 103.21 mm of Hg | 5.00 Psig (258.5 mm of Hg) | 1.37 L (337 ppm) | 2.25 L (1104 ppm) |
| 2. | 103.21 mm of Hg | 14.75 Psig (762.6 of Hg) | 5.83 L (1432 ppm) | 5.04 L (2477 ppm) |
| 3. | 103.21 mm of Hg | 29.00 Psig (1499.3 mm of Hg) | 12.34 L (3031 ppm) | 9.39 L (4614 ppm) |
| 4. | 65.82 mm of Hg | 5.00 Psig (775.5 mm of Hg) | 6.45 L (1584 ppm) | 8.04 L (3950 ppm) |
| 5. | 65.82 mm of Hg | 4.00 Psig (206.8 mm of Hg) | 1.28 L (114 ppm) | 2.34 L (1149 ppm) |
| 6. | 65.82 mm of Hg | 9.50 Psig (491.2 mm of Hg) | 3.86 L (348 ppm) | 3.38 L (1660 ppm) |
| 7. | 65.82 mm of Hg | 14.00 Psig (723.8 mm of Hg) | 5.98 L (469 ppm) | 4.89 L (2402 ppm) |
| 8. | 65.82 mm of Hg | 18.50 Psig (946.5 mm of Hg) | 8.09 L (1987 ppm) | 6.40 L (3144 ppm) |
| 9. | 65.82 mm of Hg | 27.50 Psig (1421.8 mm of Hg) | 12.32 L (3026 ppm) | 9.41 L (4622 ppm) |
| 10. | 52.16 mm of Hg | 4.2 Psig (217.1 mm of Hg) | 1.52 L (373 ppm) | 2.10 L (1032 ppm) |
| 11. | 52.16 mm of Hg | 13.50 Psig (698.0 mm of Hg) | 5.95 L (1461 ppm) | 4.92 L (2417 ppm) |
| 12. | 52.16 mm of Hg | 26.80 Psig (385.6 mm of Hg) | 12.29 L (3018 ppm) | 9.45 L (4639 ppm) |

*Margin of error is less than 3% of full-scale 0–30 psig) as per NIST calibration standard.
**Estimated solution temperature based on runs 1 and 2.
***Powdered product not packaged in PVA film, but added directly to heated water.

be a single mass, but when removed from the sawed out pipe, was found to comprise three elongated, rubbery, gelatinous, slimy semisolid masses. On the upstream side of the cutout, the mass of polymeric bacterial cellulose solidly filled half of the pipe, and the level rose to about two thirds downstream and beyond, severely reducing the capacity and flow of the drain.

The drain capacity was measured by pouring water from a bucket down the drink station drains and measuring the output at the cutout with a stopwatch. By this method, the measured flow rates varied up to sixty percent, in part because of the backups caused by cellulose blockage in the drink station drain lines. The average flow rate of 15–18 gallows per minute indicated that the cellulose deposits severely impaired the function of this drain. When the observations and measurements were completed and recorded, the removed section was replaced with a section of clear PVC pipe to permit observation of the drain as it was being treated.

To test the compositions, a water delivery system was made from an ordinary toilet plunger, a valve, and ordinary hose and pipe fittings. The plunger handle and dome were separated, and a hole was cut in the plunger dome, permitting a sealed connection of the dome interior and a half inch 90° pipe fitting. The fitting was in turn connected to the outlet of an on-off valve, which had attached to its inlet a short length of hose with a standard female hose coupling, which in operation was connected to a source of hot water.

To begin treatment, after initial observations were made and recorded, each drain was flushed with hot water. Next, the dry enzymatic detergent drain cleaner product was poured directly into the drain system through the floor drains, and the water delivery system, with the hot water source connected and the valve closed, was fitted to the floor drain to provide the tightest seal possible. Achieving a close fit required slight modification of the floor drains to accommodate the plunger dome. With the delivery system in place, the valve was opened and hot water was forced through the valve and dome into the drain system. The contact of the hot water and the dry ingredients caused a reaction that produced large quantities of foam and carbon dioxide gas, which pressurized the drain and forced the resultant enzymatic solution into the system, past the "J" bend watertrap, and into contact with the clogging cellulose deposits.

The dry enzymatic detergent drain cleaner used for this field test was prepared according to formula 102-44-0 in Example 3. The drain stations were subjected to the following treatment regimen after the drink stations were closed for the day:

|  | Drink Station 1 | Drink Station 2 |
| --- | --- | --- |
| Day 1 | Hot water flush 5 min., followed by application of 6 ounces dry detergent and 1 gallon of hot water through the delivery system. | Hot water flush 5 min., followed by two consecutive applications of 4 ounces dry detergent and 1 gallon of hot water through the delivery system. |
| Day 2 | Hot water flush 5 min.; 4 ounces of detergent with 1 gallon of hot water. | Hot water flush 5 min.; 4 ounces of detergent with 1 gallon of hot water. |
| Day 3 | Hot water flush 10 min.; 4 ounces of detergent with 1 gallon of hot water. | Hot water flush 10 min.; 4 ounces of detergent with 1 gallon of hot water. |

-continued

|  | Drink Station 1 | Drink Station 2 |
| --- | --- | --- |
| Day 4 | 4 ounces of detergent with 1 gallon of warm water, followed by 6 ounces of detergent with 1 gallon of hot water. | 4 ounces of detergent with 1 gallon of hot water. |
| Day 5 | No treatment. | No treatment. |
| Day 6 | 6 ounces of detergent and 2 gallons hot of water. | 6 ounces of detergent and 1 gallon of hot water, followed by 12 ounces of detergent and 2 gallons of hot water. |

Initial observation through the clear pipe on the first treatment day revealed that despite the removal of the section of cellulose the day before, the deposits held fast to the pipe wall upstream and downstream of the cutout. The severe clogging caused by the cellulose caused a backup and overflow of foaming detergent at one of the drains during treatment. Immediately after the first treatment, the polymeric mass remained intact, but loosened from the pipe wall and was observed to have moved about two inches downstream into the clear section of pipe.

On the day after the first treatment, the cellulosic mass had moved six inches further downstream, and brown particles of hydrolyzed materials covered the bottom of the clear pipe. The second treatment partially hydrolyzed the cellulose deposits, which washed down the drain when it was flushed with hot water. Accumulation of hydrolyzed materials was seen in the transparent pipe after the second treatment. The effect of the enzymatic detergent solution on the cellulose deposits was quite evident, as no backups occurred and the drain flow increased substantially.

The day after the second treatment, the drain was observed initially to be full of brown, particulate water, and drainage was very slow. The drains were treated and the particulate matter was thereby removed, but the blockage persisted and caused some overflow during treatment. Further investigation revealed the slow drainage was caused by a clog of unknown origin in the main drain outside of the building and not in the treated section. Following removal of the outside blockage after the third treatment, the water accumulation ceased, and the drain functioned very effectively throughout the remainder of the test. Visual inspection of the drain interior after completion of the test showed the complete removal of the bacterial cellulose deposits effected by the treatments.

The effect of increasing the temperature and enzymatic detergent drain cleaner concentration on foam generation was observed. Using the front counter drink station (Station 1) as the control facility, foam generation was observed in the clear pipe during the Day 4 treatment described in the Table above. Whereas combining four ounces of detergent with one gallon of warm water at Station 1 filled the clear section half full with foamy detergent solution, the subsequent treatment mixing six ounces of detergent and one gallon of hot water filled the clear section three quarters full with foamy solution.

The effect of proportionally increasing the amounts of dry ingredients and water on the extent of solution distribution within the drain also was observed. Using the drive-through drink station (Station 2) as the control facility, the extent of solution distribution was observed in the clear pipe during the Day 6 treatment described in the Table above. Whereas combining six ounces of dry detergent with two gallons of hot water at Station 2 caused no foamy detergent solution to reach the clear section, twelve ounces of dry detergent and two gallons of hot water filled the clear section one quarter full with foamy solution.

EXAMPLE 6

A second field test was run using the 102-44-0 formulation of Example 3 and the water delivery system in a second quick service restaurant drain system, similar to the field test described in Example 5. The second restaurant had two drink stations, one at the front counter and one at the drive-through, serviced by a four inch PVC drain. The drink station drains, with their accompanying floor drains, fed into a straight header, which had a removable plug at the upstream end and emptied into the main building drain downstream. The drive-through station drain entered the header farthest upstream, near the capped end, followed by the front counter station drain, which fed into the header five feet further downstream. A third drain, from the floor of the front counter, entered the header even further downstream, but before the point where the header connected to the main drain. No other drains were serviced by the header.

Initial observation of the untreated drain system revealed impaired function, i.e. slow drainage, in the drains feeding the header. To assist in visual inspection of the drain pipe interior, the third drain was disconnected from the header, and the remaining stub of pipe projecting from the header was capped with an easily removed rubber boot. This point was labeled "Observation Point 1," and the removable plug at the far upstream end of the header was labeled "Observation Point 2." Visual inspection of the untreated drain interior at the observation points revealed that significant polymeric bacterial cellulose had deposited in this drain system, filling half of the pipe at observation Point 2.

Treatments were made once daily after the close of business for four consecutive days. The method of application insofar as adding the dry enzymatic detergent drain cleaner to the drain, followed by hot water provided through the delivery system, was identical to the treatment method used for the field test described in Example 5. The following regimen was used on each station: the drink station floor drain was flushed with hot water; the drain was charged with dry product, 4 ounces for Station No. 1. (front counter drink station) and 8 ounces for Station No. 2 (drive-through drink station); the delivery system was fitted to the floor drain; and hot water (120°–140° F.) was delivered to each drain using the delivery system, 1 gallon to Station No. 1 and 1½ gallons to Station No. 2, while as close a seal as possible was maintained between the delivery system and the floor drain inlet, to form the foaming, enzymatic detergent solution and to force it into the drain and into contact with the cellulose deposits.

Twenty-four hours after the first treatment, partial hydrolysis was evident from the slight distortion in the appearance of the cellulose deposits from the initial observation. Twenty-four hours after the second treatment, the deposits had partially degraded and shrunk considerably, pulling away from the pipe wall filling only one third of the drain pipe at Observation Point 2, where it had previously been half full. The third treatment shrank and loosened the degraded deposits even more, and by the close of business on the fourth day, prior to the fourth treatment, no deposits were visible in drain from either observation point.

The results of the first and second field tests (Examples 5 and 6) confirmed the efficacy of the enzymatic detergent solution prepared by mixing dry enzymatic detergent drain cleaner product formulation 102-44-0 with hot water in the drain pipe itself to remove heavy polymeric bacterial cellulose deposits in the sugar-rich soft drink drain environment, as well as the efficacy of the method using the delivery system. Moreover, the second test (Example 6) confirmed that the physical disturbance of the cellulose caused by the removal of the pipe section in the first test (Example 5) was not necessary for the enzymatic solution to successfully attack bacterial cellulose deposits, since the deposits in the second test were not disturbed in any way prior to treatment.

EXAMPLE 7

A third field test was run to determine the efficacy of an enzymatic drain cleaning solution composition delivered to a clogged drain by dissolving dry product in hot water and pouring it into the drain. As for the previous tests described in Examples 5 and 6, the test facility for this field trial was a quick service restaurant drink station drain system, which served three drink stations (2 store front, 1 drive-through), including floor and ice bin drains.

Each drink station, ice bin, and floor drain combination was serviced by its own two inch drain pipe, which fed into a drain header. The drive-through drain entered the header farthest upstream, near a clean-out plug on the header that was designated "Observation Point 1", followed first by the left store front drain ("Observation Point 2") and then by the right store front drain. Through the points at which the drive through and left store front drains entered it, the drain header had a two inch diameter. Between the left and right store front drains, the header expanded to four inches in diameter and passed through a plugged trap, labelled "Observation Point 3". After the trap, the right store front drain entered the header, which then passed to the main drain.

Initial conditions were evaluated by visual inspection at the three observation points in the system. Little cellulose was found deposited upstream at the Observation Point 1, believed to be the result of a recent mechanical cleaning necessitated by chronic clogging of this drain. At the second observation point, the two inch drain pipe was almost full of bacterial cellulose deposits. At the third observation point, the four inch drain trap, a large clump of bacterial cellulose had deposited.

The initial condition of the drink station drains was observed as well. The right store front drink station drain was significantly clogged, and the drive-through floor drain contained significant bacterial cellulose deposits. In addition, the drive-through drink station and ice bin drain was completely blocked, providing no opportunity for the enzymatic cleaning solution to penetrate the deposits and to attack their surface. Accordingly, a short section of this drain was removed and partially opened manually before treatment to allow the cleaner to penetrate the blockage.

Following these preparations, the drink station drain system was treated once a day, fourteen times over a fifteen day period, with visual inspection after every third treatment. Drain cleaning solutions for each station were prepared by dissolving 4 to 8 ounces of enzymatic detergent drain cleaner formulation 102-44-0 with 1 to 1½ gallons of hot (approximately 140° F.) tap water in a 5 gallon bucket, and allowing the resultant foam to collapse. Once the foam subsided, usually in about 2 to 5 minutes, half of the cleaning solution was poured down the drink station drain and the other half into the ice bin drain, using a small styrofoam cup. The ice bin and drink station drains are joined and then their common drain enters the floor drain. Using this method, the drain system was subjected to the following treatment regimen:

| | Drive-Through | Left Store Front | Right Store Front |
|---|---|---|---|
| Day 1 | Drains flushed with hot water; drains treated with cleaning solution prepared by mixing 4 ounces of dry product with 1 gallon of hot water. | Drains flushed with hot water; drains treated with cleaning solution prepared by mixing 4 ounces of dry product with 1 gallon of hot water. | Drains flushed with hot water; drains treated with cleaning solution prepared by mixing 4 ounces of dry product with 1 gallon of hot water. |
| Day 2 | Drains flushed with 3 gallons of hot water; drains treated with cleaning solution prepared by mixing 8 ounces of dry product with 1 gallon of hot water. | Drains flushed with 1 gallon of hot water; drains treated with cleaning solution prepared by mixing 8 ounces of dry product with 1 gallon of hot water. | Drains flushed with 1 gallon of hot water; drains treated with cleaning solution prepared by mixing 8 ounces of dry product with 1 gallon of hot water. |
| Day 3 | Drains flushed with 3 gallons of hot water; drains treated with cleaning solution prepared by mixing 8 ounces of dry product with 1 gallon of hot water. | Drains flushed with 1 gallon of hot water; drains treated with cleaning solution prepared by mixing 8 ounces of dry product with 1 gallon of hot water. | Drains flushed with 1 gallon of hot water; drains treated with cleaning solution prepared by mixing 8 ounces of dry product with 1 gallon of hot water. |
| Day 4 | Drains flushed with 1½ gallons of hot water; drains treated with cleaning solution prepared by mixing 8 ounces of dry product with 1½ gallons of hot water. | Drains flushed with 1½ gallons of hot water; drains treated with cleaning solution prepared by mixing 8 ounces of dry product with 1½ gallons of hot water. | Drains flushed with 1½ gallons of hot water; drains treated with cleaning solution prepared by mixing 8 ounces of dry product with 1½ gallons of hot water. |
| Day 5 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. |
| Day 6 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1 gallon of hot water. |
| Day 7 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1 gallon of hot water. |
| Day 8 | No treatment. | No treatment. | No treatment. |
| Day 9 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1½ gallons of hot water. |
| Day 10 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1½ gallons of hot water. |
| Day 11 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1½ gallons of hot water. |
| Day 12 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1½ gallons of hot water. |
| Day 13 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1½ gallons of hot water. |
| Day 14 | Drains flushed with 3 gallons of hot water; drains treated with cleaning solution prepared by mixing 4 ounces of dry product with 1 gallon of hot water. | Drains flushed with 1 gallon of hot water; drains treated with cleaning solution prepared by mixing 4 ounces of dry product with 1 gallon of hot water. | Drains flushed with 1 gallon of hot water; drains treated with cleaning solution prepared by mixing 8 ounces of dry product with 1½ gallons of hot water. |
| Day 15 | Drains flushed with 3 gallons of hot water; drains treated with cleaning solution prepared by mixing 4 ounces of dry product with 1 gallon of hot water. | Drains flushed with 1½ gallons of hot water; drains treated with cleaning solution prepared by mixing 4 ounces of dry product with 1½ gallons of hot water. | Drains flushed with 1 gallon of hot water; drains treated with cleaning solution prepared by mixing 8 ounces of dry product with 1½ gallons of hot water. |

Twenty-four hours after the third treatment, the drains were inspected at the observation points identified above. The two inch drain pipe at Observation Points 1 and 2 was completely clear of any cellulose material. At Observation Point 3, the four inch trap, about 7 gallons of waste material composed of brown particulates, oily material, and long strands of bacterial cellulose was drained from the drain system after opening the plug. Following removal of this material, the trap also was clear of any deposits. Close inspection of the cellulose recovered from the trap revealed that the material was degrading.

In addition to the above treatments and observations, the performance of each of the two store front drains was monitored through the course of the test. The results of this investigation are set forth in the Table that follows:

| Time To Drain 1½ Gallons Of Treatment Solution | | |
|---|---|---|
| Treatments Completed | Store Front Left | Store Front Right |
| 4 | Approx. 2 min. | Approx. 15 min. |
| 8 | Approx. 2 min. | Approx. 5 min. |
| 9 | Approx. 2 min. | Approx. 5 min. |
| 10 | Approx. 2 min. | Approx. 4 min. |
| 11 | Approx. 2 min. | Approx. 4 min. |
| 12 | Approx. 2 min. | Approx. 3½ min. |
| 13 | Approx. 2 min. | Approx. 3 min. |
| 14 | Approx. 1¾ min. | Approx. 2⅓ min. |

This data confirms that a substantial cellulose blockage was present in the right store front drink station drain at the beginning of this field test, which blockage was significantly if not completely eliminated after treatment with the enzymatic cleaning solution. This field test confirmed that the enzymatic drain cleaning solution functioned effectively when applied in the described dissolve and pour method, requiring no special delivery system or conditions.

EXAMPLE 8

A fourth field test was performed to evaluate the efficacy of dry enzymatic detergent drain cleaner product formulations 102-44-0 and 102-51-4 to remove fresh cellulose deposits that had grown in previously treated drain systems. For this field test, the drain system treated in the first field test described in Example 5 was revisited.

In the two months that elapsed from that earlier field test, significant and substantial quantities of fresh cellulose had grown in the drain system, filling approximately half of the diameter of the clear pipe installed for observation in the first field test. In addition, a drain serving the restaurant's three-compartment sink was very slow and believed to be clogged with bacterial cellulose deposits.

Each drink station drain was treated at the close of business for three consecutive days using the dissolve and pour method described in Example 7. Thus, the drain system was subjected to the following treatment regimen:

| | Store Front | Drive Through |
|---|---|---|
| Day 1 | Drains flushed with 2 gallons of hot water; drains treated with cleaning solution prepared by mixing 8 ounces of dry product formula 102-44-0 with 1½ gallons of hot water. | Drains flushed with 2 gallons of hot water; drains treated with cleaning solution prepared by mixing 8 ounces of dry product formula 102-44-0 with 1½ gallons of hot water. |
| Day 2 | Drains flushed with 2 gallons of hot water; drains treated with cleaning solution prepared by mixing 4 ounces of dry product formula 102-51-4 with 1½ gallons of hot water. | Drains flushed with 2 gallons of hot water; drains treated with cleaning solution prepared by mixing 4 ounces of dry product formula 102-51-4 with 1½ gallons of hot water. |
| Day 3 | Drains flushed with 2 gallons of hot water; drains treated with cleaning solution prepared by mixing 4 ounces of dry product formula 102-51-4 with 1½ gallons of hot water. | Drains flushed with 2 gallons of hot water; drains treated with cleaning solution prepared by mixing 4 ounces of dry product formula 102-51-4 with 1½ gallons of hot water. |

Twenty-four hours after the first treatment, the cellulose build-up had become loosened and swelled due to partial hydrolysis, and forty-eight hours after the first treatment, the cellulose build-up appeared shrunken. The third treatment was initiated by adding 5 gallons of hot water to the drive through ice bin drain, after which the degraded bacterial cellulose deposits were observed through the clear section to have begun moving down towards the main drain. Five additional gallons of hot water were poured down the sink, causing the bacterial cellulose deposits to move further and to completely clear the drain system. This test confirmed that dry formulations 102-44-0 and 102-51-4 were effective to clear fresh bacterial cellulose build-up using the dissolve and pour method. Further, it was confirmed that this treatment hydrolyzed the bacterial cellulose to a point that running hot water down the drain would successfully flush the deposits from the system following treatment.

What is claimed is:

1. A method of removing or preventing bacterial cellulose deposits in an aqueous system comprising:
    (a) forming an aqueous solution by adding together an enzymatic detergent drain cleaner consisting essentially of:
        (1) about 0.015% to about 20% by weight of an acid cellulase enzyme having hydrolytic activity specific to β-glucosidic bonds;
        (2) about 1% to about 70% by weight of a water soluble carbonate salt;
        (3) about 1% to about 70% by weight of a water soluble acid that reacts in an aqueous medium at standard temperature and pressure with the carbonate salt to form at least 100 ppm of carbon dioxide that dissolves in the aqueous medium;
        (4) about 0.1% to about 10% by weight of a surfactant; and
        (5) about 0.05% to about 5% by weight of a thickening agent, with an aqueous medium; and
    (b) contacting an aqueous system in recognized need of such removal or prevention with the aqueous solution for a sufficient time to at least partially hydrolyze the bacterial cellulose, whereby the partially hydrolyzed bacterial cellulose is removed from said aqueous system.

2. The method of claim 1, wherein the aqueous solution has a temperature of up to about 60° C. and a pH of about 2 about 7.

3. The method of removing or preventing bacterial cellulose deposits in an aqueous system according to claim 1, wherein the aqueous solution is formed by adding together an enzymatic detergent drain cleaner consisting essentially of:
- (1) about 0.05% to about 15% by weight of an acid cellulase enzyme having hydrolytic activity specific to β-glucosidic bonds;
- (2) about 10% to about 50% by weight of a water soluble carbonate salt;
- (3) about 10% to about 50% by weight of a water soluble acid that reacts in an aqueous medium at standard temperature and pressure with the carbonate salt to form at least 100 ppm of carbon dioxide that dissolves in the aqueous medium;
- (4) about 0.5% to about 8% by weight of a surfactant; and
- (5) about 0.1% to about 4% by weight of a thickening agent, with an aqueous medium.

4. The method of claim 3, wherein the aqueous solution has a temperature of 40° C. to about 55° C. and a pH of about 3.5 to about 6.5.

5. The method of removing or preventing bacterial cellulose deposits in an aqueous system according to claim 1, wherein the aqueous solution is formed by adding together an enzymatic detergent drain cleaner consisting essentially of:
- (1) about 0.5% to about 10% by weight of an acid cellulase enzyme having hydrolytic activity specific to β-glucosidic bonds;
- (2) about 10% to about 50% by weight of an acid selected from the group consisting of sulfamic acid and citric acid;
- (3) about 30% to about 50% by weight of sodium bicarbonate;
- (4) about 1% to about 10% by weight of sodium carbonate;
- (5) about 2% to about 10% by weight of a powdered sodium dodecyl benzene sulfonate surfactant; and
- (6) about 1% to about 5% by weight of a crosslinked polyacrylic acid thickening agent, with an aqueous medium.

6. The method of claim 5, wherein the aqueous solution has a temperature of about 40° C. to about 50° C. and a pH of about 4 to about 5.5.

7. The method of removing or preventing bacterial cellulose deposits in an aqueous system according to claim 1, wherein the aqueous solution is formed by adding together an enzymatic detergent drain cleaner consisting essentially of:
- (1) about 6% by weight of an acid cellulase enzyme having hydrolytic activity specific to β-glucosidic bonds;
- (2) about 43% by weight of citric acid;
- (3) about 40% by weight of sodium bicarbonate;
- (4) about 5% by weight of sodium carbonate;
- (5) about 10% by weight of a powdered sodium dodecyl benzene sulfonate surfactant; and
- (6) about 1% by weight of a crosslinked polyacrylic acid thickening agent, with an aqueous medium.

8. The method of claim 7, wherein the aqueous solution has a temperature of about 40° C. to about 50° C. and a pH of about 4 to about 5.5.

9. The method of removing or preventing bacterial cellulose deposits in an aqueous system according to claim 1, wherein the aqueous solution is formed by adding together an enzymatic detergent drain cleaner consisting essentially of:
- (1) about 4% by weight of an acid cellulase enzyme having hydrolytic activity specific to β-glucosidic bonds;
- (2) about 40% by weight of sulfamic acid;
- (3) about 40% by weight of sodium bicarbonate;
- (4) about 5% by weight of sodium carbonate;
- (5) about 10% by weight of a powdered sodium dodecyl benzene sulfonate surfactant; and
- (6) about 1% by weight of a crosslinked polyacrylic acid thickening agent, with an aqueous medium.

10. The method of claim 9, wherein the aqueous solution has a temperature of about 40° C. to about 50° C. and a pH of about 4 to about 5.5.

11. A method of removing or preventing bacterial cellulose deposits in an aqueous system comprising the step of contacting an aqueous system in recognized need of such removal or prevention with a composition consisting essentially of an aqueous solution of an acid cellulase enzyme present in an amount of at least about 0.015 g/l and having hydrolytic activity specific to β-glucosidic bonds, and said aqueous solution having a dissolved carbon dioxide concentration of at least about 100 ppm at standard temperature and pressure, for a sufficient time to at least partially hydrolyze the deposits, whereby the partially hydrolyzed bacterial cellulose is removed from the aqueous system.

12. The method of removing or preventing bacterial cellulose deposits according to claim 11, said composition consisting essentially of an aqueous solution of an acid cellulase enzyme present in an amount of at least about 0.15 g/l and having hydrolytic activity specific to β-glucosidic bonds, and said aqueous solution having a dissolved carbon dioxide concentration of at least about 300 ppm at standard temperature and pressure.

13. The method of removing or preventing bacterial cellulose deposits according to claim 11, said composition consisting essentially of an aqueous solution of an acid cellulase enzyme present in an amount of at least about 0.30 g/l and having hydrolytic activity specific to β-glucosidic bonds, and said aqueous solution having a dissolved carbon dioxide concentration of at least about 500 ppm at standard temperature and pressure.

14. The method of removing or preventing bacterial cellulose deposits according to claim 11, wherein said carbon dioxide concentration is provided at least in part by a system for enriching the aqueous system with dissolved carbon dioxide, comprising a water soluble carbonate salt selected from the group consisting of carbonate salts of alkali metals, carbonate salts of alkaline earth metals, ammonium carbonate, and ammonium bicarbonate and a water soluble acid selected from the group consisting of formic acid, acetic acid, hydroxyacetic acid, propionic acid, butyric acid, valeric acid, caproic acid, lauric acid, palmitic acid, stearic acid, citric acid, sebacic acid, gluconic acid, tartaric acid. succinic acid, malic acid, uric acid, polymaleic-acrylic acids, acrylic acids, polyacrylic acids, maleic acid, benzoic acid, fumaric acid, isophthalic acid, terephthalic acid, suberic acid, pimelic acid, malonic acid, glutaric acid, adipic acid, lactic acid, hydrochloric acid, hydrofluoric acid, hydrobromic acid, hydroiodic acid, sulfuric acid, sulfamic acid, sulfurous acid. phosphoric acid, phosphorous acid, polyphosphoric acid, hypophosphorous acid, and boric acid, that, under aqueous conditions. reacts with the salts to form carbon dioxide that dissolves in the aqueous system.

said composition further comprising at least about 0.25 gl/l of a surfactant and at least about 0.15 g/l of a thickener, wherein said aqueous solution has a temperature of up to about 60° C. and a pH of about 2 to about 7.

15. The method of removing or preventing bacterial cellulose deposits according to claim 14, wherein said aqueous solution has a temperature about 40° C. to 55° C. and a pH of about 3.5 to about 6.5.

16. The method of removing or preventing bacterial cellulose deposits according to claim 15, wherein said aqueous solution has a temperature about 40° C. to 50° C. and a pH of about 4 to about 5.5.

17. The method of removing or preventing bacterial cellulose deposits according to claim 14, wherein glucono-δ-lactone, sodium bisulfate, or sodium bisulfite is used in place of the water soluble acid.

18. The method of removing or preventing bacterial cellulose deposits according to claim 15, wherein glucono-δ-lactone, sodium bisulfate, or sodium bisulfite is used in place of the water soluble acid.

19. The method of removing or preventing bacterial cellulose deposits according to claim 16, wherein glucono-δ-lactone, sodium bisulfate, or sodium bisulfite is used in place of the water soluble acid.

* * * * *